Oct. 10, 1933.   A. G. CARTER   1,929,806
BAND SAW GUIDE
Filed April 16, 1931
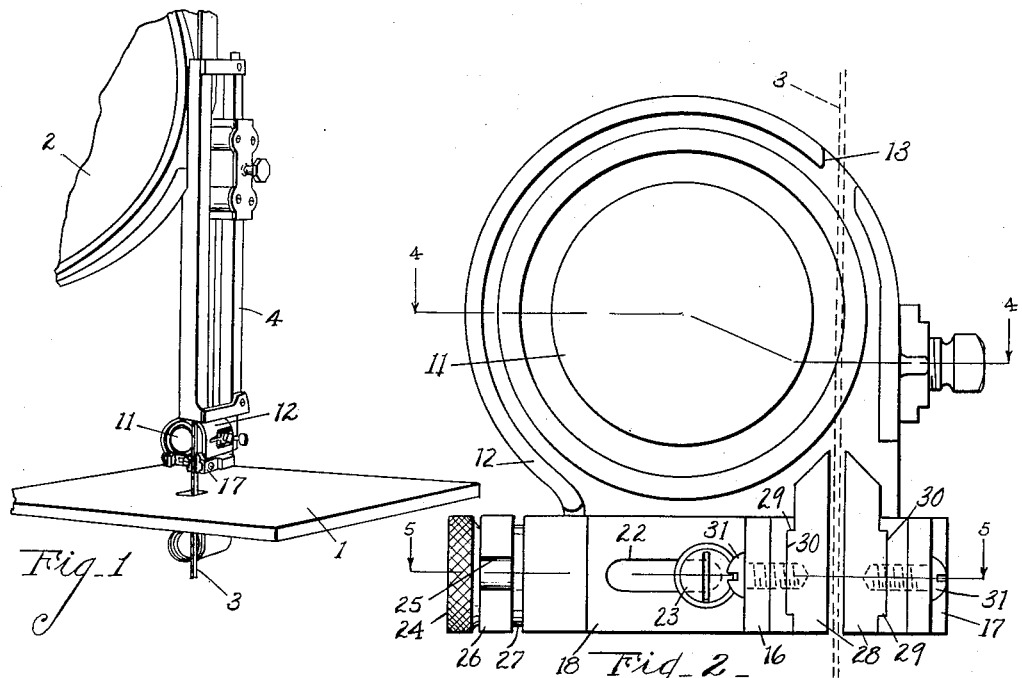
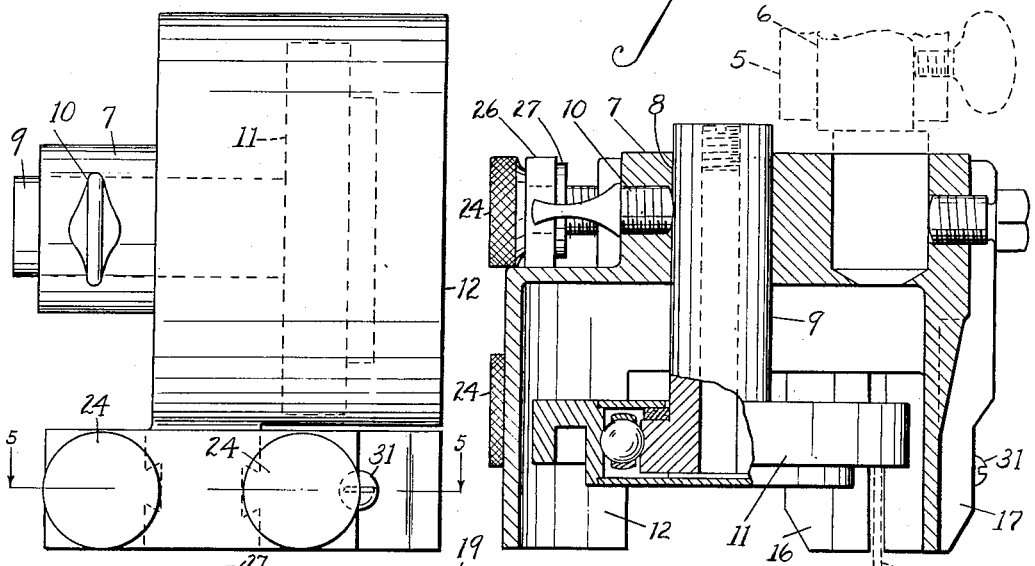
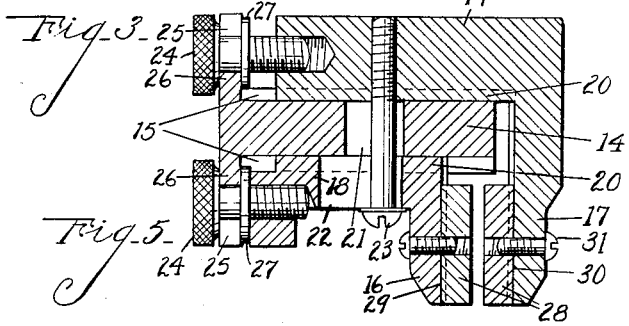
INVENTOR
Andrew G. Carter
BY
Chappell Earl
ATTORNEYS Patented Oct. 10, 1933

1,929,806

UNITED STATES PATENT OFFICE 1,929,806

BAND SAW GUIDE

Andrew G. Carter, Grand Rapids, Mich.

Application April 16, 1931. Serial No. 530,538

6 Claims. (Cl. 143—161)

The main objects of this invention are:

First, to provide a bandsaw guide including a guide wheel and guide jaws or blocks which is very compact and efficient for the purpose.

Second, to provide a structure having these advantages in which the band saw guide wheel is effectively guarded and supported close to the guide jaws.

Third, to provide a band saw guide comprising a guide wheel and jaws in which the parts are so arranged that there is considerable latitude in adjustment, not only to properly position the jaws and compensate for wear thereof, but to distribute the wear to the guide wheel.

Fourth, to provide a band saw guide in which the adjusting parts are all readily accessible and are positioned so that the saw is not likely to be fouled therewith in the event of breakage of the saw.

Fifth, to provide a structure having these advantages which is simple and economical in its parts and very easily adjusted.

Objects pertaining to details and economies of my invention will definitely appear from the description to follow. The invention is defined in the claims.

A structure embodying the features of my improvements is clearly illustrated in the accompanying drawing, in which:

Fig. 1 is a fragmentary perspective view of a band saw machine embodying the features of my invention, only such parts being illustrated as are deemed desirable to illustrate my invention.

Fig. 2 is a front view of one of my improved guide units.

Fig. 3 is an elevation thereof looking from the left of Fig. 2.

Fig. 4 is a fragmentary view partially in section on the broken line 4—4 of Fig. 2.

Fig. 5 is a detail view mainly in section on line 5—5 of Fig. 3.

In the accompanying drawing 1 represents a saw table, 2 the upper band wheel, 3 the saw and 4 the portion of the frame of the machine on which the upper saw guide is mounted. This support 4 has a part 5 indicated by dotted lines in Fig. 4 adapted to receive the stud 6 upon which the saw guide support or head 7 is mounted. This support or head 7 is preferably a casting, and is provided with a bore 8 adapted to receive the stub shaft 9 of the saw guide wheel. This shaft 9 is secured in position in the support by means of the set screw 10.

The saw guide wheel 11 is illustrated in and made the subject matter of a companion application filed concurrently herewith, and, therefore, the details of this wheel are not further described in this application.

The support is provided with a flange-like guard or housing 12 for the band saw guide wheel. This housing is open at one side and has a saw slot 13 at its opposite side. At the open side of the guard the support is provided with a bracket 14 having grooves 15 on opposite sides thereof preferably dove-tailed.

The guide jaws 16 and 17 are provided with slides 18 and 19, respectively, which have tongues 20 engaging the grooves 15 and slidably supporting the jaws for adjustment in the same plane to and from each other, and also relative to the band saw guide wheel so that the full wearing surface of the wheel may be utilized.

The bracket is provided with a longitudinal slot 21 while the slides 18 are provided with a longitudinal slot 22, the clamping screw 23 being arranged through these slots and into the slide 19 as shown in Fig. 5 so that the single screw serves to clamp both jaws in their adjusted positions and the screw may be manipulated from the front of the guide.

The jaws may be accurately adjusted by means of the screws 24 which are rotatably engaged with slots 25 in the laterally projecting arms 26 at the inner end of the bracket, the screws being threaded into the inner ends of the slides and provided with thrust collars 27.

By providing the arms with slots the screws may be engaged from the outer ends thereof and then threaded into the jaw slides, thereby providing a convenient means of assembling. The jaws are provided with wear plates or blocks 28 which have tongues 29 on their rear sides engaged in recesses 30 in the jaws, the screws 31 arranged through the jaws from the outer side thereof clamping the wear plates or jaw blocks in position so that they may be readily dismounted for grinding or renewal as occasion may require.

With this arrangement of parts the guide offers a minimum of obstruction to the work, there being a minimum of projecting parts at the front side. A single guide unit is found to be all that is required, that is, it is common practice to provide a pair of spaced guides above the table. My single guide unit may be positioned relatively close to the table.

A further advantage is that while the adjusting means is fully accessible, such means are located so that they are not likely to foul the saw in case of breakage.

The guide unit below the table may be the same as that described, arranged in an inverted position indicated in Fig. 2.

I have not attempted to illustrate various modifications and adaptations as it is believed that this disclosure will enable those skilled in the art to embody my improvements as may be desired.

Having thus described my invention what I claim as new and desire to secure by Letters Patent is:

1. In a band saw guide, the combination of a support provided with a flange-like band saw guide wheel guard open at one side and having a saw slot opposite its open side, said support having a guide jaw bracket at the open side of said guard, said bracket being slotted and provided with oppositely disposed grooves on its sides and with oppositely projecting slotted arms at its inner end, a pair of coacting guide jaws having supporting slides disposed at right angles thereto and provided with tongues coacting with said grooves in said bracket, the front slide being slotted, the jaw carried by the rear slide being supported thereby at the outer end of the bracket, adjusting screws rotatably engaged in said slots in said bracket arms and having threaded engagement with the inner ends of said slides, a clamping screw disposed through said slots in said bracket and front slide and threaded into the rear slide to simultaneously clamp the slides in their adjusted positions, guide blocks provided with tongues on their rear sides, said jaws being recessed on their inner sides to receive said tongues, and screws disposed through said jaws from the outer sides thereof and threaded into said blocks for detachably securing them to the jaws.

2. In a band saw guide, the combination of a support provided with a flange-like band saw guide wheel guard open at one side and having a saw slot opposite its open side, said support having a guide jaw bracket at the open side of said guard, said bracket being slotted and provided with oppositely disposed grooves on its sides and with oppositely projecting slotted arms at its inner end, a pair of coacting guide jaws having supporting slides disposed at right angles thereto and provided with tongues coacting with said grooves in said bracket, the front slide being slotted, the jaw carried by the rear slide being supported thereby at the outer end of the bracket, adjusting screws rotatably engaged in said slots in said bracket arms and having threaded engagement with the inner ends of said slides, and a clamping screw disposed through said slots in said bracket and front slide and threaded into the rear slide to simultaneously clamp the slides in their adjusted positions.

3. In a band saw guide, the combination of a guide jaw bracket slotted and provided with oppositely disposed grooves on its sides and with oppositely projecting slotted arms at its inner end, a pair of coacting guide jaws having supporting slides disposed at right angles thereto and provided with tongues coacting with said grooves in said bracket, the front slide being slotted, the jaw carried by the rear slide being supported thereby at the outer end of the bracket, adjusting screws rotatably engaged in said slots in said bracket arms and having threaded engagement with the inner ends of said slides, a clamping screw disposed through said slots in said bracket and front slide and threaded into the rear slide to simultaneously clamp the slides in their adjusted positions, guide blocks provided with tongues on their rear sides, said jaws being recessed on their inner sides to receive said tongues, and screws disposed through said jaws from the outer sides thereof and threaded into said blocks detachably securing them to said jaws.

4. In a band saw guide, the combination of a guide jaw bracket slotted and provided with oppositely disposed grooves on its sides and with oppositely projecting slotted arms at its inner end, a pair of coacting guide jaws having supporting slides disposed at right angles thereto and provided with tongues coacting with said grooves in said bracket the front slide being slotted, the jaw carried by the rear slide being supported thereby at the outer end of the bracket, adjusting screws rotatably engaged in said slots in said bracket arms and having threaded engagement with the inner ends of said slides, and a clamping screw disposed through said slots in said bracket and front slide and threaded into the rear slide to simultaneously clamp the slides in their adjusted positions.

5. In a band saw guide, the combination of a slotted guide jaw bracket, a pair of coacting guide jaws having supporting slides disposed on opposite sides of said bracket and having tongue and groove engagement therewith, one of these slides being slotted, the jaw carried by one of the slides being supported thereby at the outer end of the bracket, individual adjusting screws for said slides, each affording a direct swivel engagement and threaded engagement between a fixed bearing and a slide, arms on said bracket to carry said adjusting screws in close engagement therewith, and a clamping screw disposed through said slots in said bracket and slide to simultaneously clamp the slides in their adjusted positions.

6. In a band saw guide, the combination of a guide jaw bracket slotted and provided with oppositely disposed grooves on its sides and with oppositely projecting slotted arms at its inner end, a pair of coacting guide jaws having supporting slides disposed at right angles thereto and provided with tongues coacting with said grooves in said bracket, the front slide being slotted, the jaw carried by the rear slide being supported thereby at the outer end of the bracket, adjusting screws rotatably engaged in said slots in said bracket arms and having threaded engagement with the inner ends of said slides, a clamping screw disposed through said slots in said bracket and front slide and threaded into the rear slide to simultaneously clamp the slides in their adjusted positions.

ANDREW G. CARTER.